United States Patent [19]
Kondo et al.

[11] Patent Number: 5,214,416
[45] Date of Patent: May 25, 1993

[54] ACTIVE MATRIX BOARD

[75] Inventors: Hitoshi Kondo, Machida; Eiichi Ohta, Kawasaki; Yuji Kimura, Yokohama, all of Japan

[73] Assignee: Ricoh Company, Ltd., Tokyo, Japan

[21] Appl. No.: 619,964

[22] Filed: Nov. 30, 1990

[30] Foreign Application Priority Data

Dec. 1, 1989 [JP] Japan ................................ 1-313144

[51] Int. Cl.$^5$ .................................................. G09G 3/20
[52] U.S. Cl. ........................................ 340/766; 340/781; 257/750
[58] Field of Search ............... 340/766, 781, 783, 784, 340/785; 357/67, 71; 359/54, 57

[56] References Cited

U.S. PATENT DOCUMENTS

| | | | |
|---|---|---|---|
| 4,368,523 | 11/1983 | Kawate | 350/334 X |
| 4,600,274 | 7/1986 | Morozumi | 350/339 F |
| 4,653,862 | 3/1987 | Morozumi | 350/339 F |
| 4,716,403 | 12/1987 | Morozumi | 350/339 F X |
| 4,775,861 | 10/1988 | Saito | 350/333 X |
| 4,851,827 | 7/1989 | Nicholas | 350/333 X |
| 4,928,161 | 5/1990 | Kobayashi | 357/71 |
| 4,930,874 | 6/1990 | Mitsumune et al. | 350/333 |
| 4,975,760 | 12/1990 | Dohjo et al. | 357/71 |
| 4,979,019 | 12/1990 | Paqnette et al. | 357/71 |
| 5,008,732 | 11/1989 | Kondo et al. | 357/71 |
| 5,101,288 | 3/1992 | Ohta et al. | . |
| 5,117,299 | 5/1992 | Kondo et al. | . |
| 5,132,676 | 7/1992 | Kimmura et al. | . |
| 5,142,390 | 8/1992 | Ohta et al. | . |
| 5,153,753 | 10/1992 | Ohta et al. | . |

FOREIGN PATENT DOCUMENTS 62-291081 12/1987 Japan .

OTHER PUBLICATIONS

Yoder, Max N., Extended Abstracts: Technology Update on Diamond Films, Apr. 25, 1989, pp. 35-38.
Han, He-Xiang et al., Extended Abstracts:Diamond and Diamond-Like Materials Synthesis, pp. 23-26.

*Primary Examiner*—Ulysses Weldon
*Assistant Examiner*—M. Fatahiyar
*Attorney, Agent, or Firm*—Oblon, Spivak, McClelland, Maier & Neustadt

[57] ABSTRACT

An active matrix board comprising: an electrically insulating transparent substrate; a pixel electrode disposed in two dimensions on the substrate for each pixel; a scanning electrode arranged in common to the pixel electrodes disposed along a predetermined direction; and a switching element disposed between each of the pixel electrodes and the scanning electrode. The switching element is constituted from a thin film two-terminal element which is composed of a first conductor, a second conductor, and a hard carbon film. The hard carbon film is disposed between the first and second conductors. The element has a standard deviation of current distribution in a surface of the substrate when applied with a predetermined voltage which deviation is less than 35% of the current average.

7 Claims, 3 Drawing Sheets

ACTIVE MATRIX BOARD

BACKGROUND OF THE INVENTION

1. Field of the Invention

The present invention relates to an active matrix board, more particularly, it relates to an active matrix printed circuit board which is suitably applied to a liquid crystal display device such as a flat panel display for OA systems or TV set.

2. Description of the Related Art

A liquid crystal display panel having a large display area is strongly desired to be used for terminal equipments of OA devices or a liquid crystal TV set. Such a large sized liquid crystal display device is arranged to be provided with an active matrix printed circuit board to maintain the voltage applied thereto. Such an active matrix board comprises a substrate, pixel electrodes formed on the substrate, scanning electrodes also formed on the substrate, and a switch element formed between the pixel electrode and the scanning electrode for each pixel.

An MIM element is usually arranged as such a switch element of the active matrix board since the MIM element comprises a thin film two-terminal element which has a non-linear current-voltage characteristic that is desirable for switching function.

The thin film two-terminal element comprises an electrically insulating substrate such as a glass plate, a lower electrode made from a metal such as Ta, Al, Ti, etc., formed on the substrate, an electrically insulating film made from an oxide of the metal or SiOx or SiNx formed on the electrode, and an upper electrode made from a metal such as Al or Cr, etc., formed on the insulating film.

Examples of the thin film two-terminal element using a metal oxide as the insulator (insulating film) are disclosed in Japanese Patent Application Laying Open Nos. 57-196589, 61-232689 and 62-62333.

However, in accordance with the examples disclosed in the patent documents, the insulating film is formed by a thermal oxidizing process or an anodic oxidation process to oxidize the lower electrode. Therefore, the process for producing the element becomes complicated and necessitates a high temperature thermal treatment step (even in the anodic oxidation process, a thermal treatment step is conducted to remove impurities). Also, the film is not well controlled, that is, the film quality and film thickness are not constant and the reproductivity thereof is not satisfactory. Besides, the freedom of design is narrowed since the device material and the characteristic thereof are limited, because the substrate has to be made from a heat resisting material and the insulating film has to be made from a metal oxide that has constant physical properties.

Therefore, it is difficult to obtain a device that fully satisfies the requirements needed for one to be applied to the liquid crystal display device having the thin film two-terminal element.

Also, due to the insufficient film controllability, it is difficult to obtain a constant and stable element characteristic with regard to the current characteristic (I), the voltage characteristic (V), especially the I-V characteristic and the symmetricity of the I-V characteristic, that is, the current ratio $I_-/I_+$ between the current of the positive bias voltage and that of the negative bias voltage.

Further, when the thin film two-terminal element is applied to the liquid crystal display device, it is desirable in general that the ratio of the capacity of the liquid crystal portion with respect to that of the thin film two-terminal element be more than 10. However, the capacity of the known thin film two-terminal element is large since the metal oxide film has a large dielectric constant. Therefore, it becomes necessary to reduce the size of the element to decrease the capacity thereof, which necessitates a fine processing of the element. This also results in that the through-put of the production is lowered since the insulating film is mechanically damaged at the time of rubbing process when the liquid crystal material is to be sealed in the device.

Besides, there is an appropriate range of element characteristic for driving the liquid crystal at a low duty ratio, more precisely below 1/400 wherein the active matrix arrangement is to be provided to drive the liquid crystal. When a plurality of elements are arranged within the display surface and the elements are to be driven at the same condition, the characteristic dispersion of the elements in the display surface has to be within the range mentioned above. However, such a characteristic range has not been prescribed so far, so that the dispersion of the characteristic between the elements becomes large, which results in the unevenness of display.

SUMMARY OF THE INVENTION

Therefore, a primary object of the present invention is to provide an active matrix board comprising a thin film two-terminal element which can be produced at a relatively low temperature through a simplified process and makes it possible to widen the design freedom by using the insulating film (hard carbon film) that is mechanically strong and can be well controlled in the forming process, so that the dispersion of the element characteristic is reduced, upgrading the element properties of threshold voltage and endurable voltage, and the through-put of producing the elements can be raised.

Further, a second object of the present invention is to provide an active matrix board which makes it possible to form an even display over an entire area of the display panel surface.

The above mentioned objects of the present invention can be achieved by an active matrix board comprising: a transparent insulating base board; pixel electrodes disposed in two dimensions for displaying each pixel; a scanning electrode disposed in common with the pixel electrodes arranged side by side along a predetermined direction; a switching element interposed between each pixel electrode and the scanning electrode, the switching element being formed as a thin film two-terminal element comprising a first conductor, a second conductor, and a hard carbon film interposed between the first and second conductors, wherein at the time of applying a predetermined constant voltage to each thin film two-terminal element, the standard deviation of the current distribution in the board is below 35%, preferably below 18%, of the average of the current value.

The above mentioned current-voltage characteristic of the thin film two-terminal element applied to the active matrix board in accordance with the present invention can be represented by the following equation of transfer.

$$I = \kappa \exp(\beta V^{\frac{1}{2}}) \qquad (1)$$

wherein
I: current,
V: applied voltage,
κ: conductivity coefficient,
β: Pool-Frenkel coefficient.

$$\kappa = \frac{n\mu q}{d} \exp\left(\frac{-\Phi}{kT}\right) \propto \frac{1}{\rho d} \quad (T = \text{const.}) \quad (2)$$

$$\beta = \frac{1}{kT}\left(\frac{q^3}{\pi\epsilon_r\epsilon_0 d}\right)^{\frac{1}{2}} \propto \frac{1}{\sqrt{\epsilon_1 d}} \quad (T = \text{const.}) \quad (3)$$

wherein
n: carrier density,
μ: carrier mobility,
q: charge amount of electron,
Φ: trap depth,
ρ: specific resistance,
d: insulation film thickness (Å)
k: Boltzmann constant,
T: ambient temperature,
$\epsilon_1$: dielectric constant of insulation film.

It can be seen from those equations that it becomes necessary to keep the distribution of the hard carbon film thickness (d), the specific resistance (ρ), and the dielectric constant ($\epsilon_1$) below a predetermined value to maintain the current distribution in the board below a predetermined value at the time of applying a predetermined voltage to the matrix.

In accordance with the thin film two-terminal element of the present invention, the element comprises a first conductor, a second conductor, and a hard carbon film disposed between the first and second conductors, wherein the distribution of the film thickness in the board is kept less than ±35% of its central value, preferably less than ±5% of its central value. Further, in accordance with the present invention, the specific resistance distribution of the hard carbon film in the board is kept less than ±95% of its central value, preferably less than ±50% of its central value.

The film thickness distribution in the board can be directly measured by a surface roughness meter utilizing a probe means or an STM (Scanning Tunneling Microscopy). Or it may be indirectly measured by using a sample of the board having the film formed thereon under the same condition without constituting the element. The film thickness distribution of the sample is measured by a polarization analysis method (ellipsometric method) at every position where the element is to be formed.

The specific resistance distribution can be determined directly from ρ=RS/d by measuring the resistance (R=I/V) of each element, and the area (S) and thickness (d) thereof. Or it may be indirectly measured by using a sample of the board having the film formed thereon under the same condition. The resistance distribution of the sample is measured by a two-terminal method or a four-terminal method at every position where the element is to be formed.

In order to obtain the above mentioned distibution of the film thickness and that of the specific resistance in the board surface, it is desirable that the film be formed on the substrate by a best appropriate process under best appropriate conditions. For example, when the film is formed by a gas phase method such as a plasma CVD process, the inventors found that the method for introducing the original gas is most influential. That is, the desired results can be obtained by introducing the gas as shower rather than spraying the gas from a point such as nozzle.

An advantage of the above mentioned active matrix board in accordance with the present invention is that due to the hard carbon film interposed between the first and second conductors, the design freedom of the device is increased since the film can be formed by a gas phase method such as a plasma CVD process in which physical properties of the film can be widely controlled by changing the film forming conditions.

Another advantage of the present invention is that the film can be formed as being hard and thick, which makes it possible to avoid being mechanically damaged and decrease the generation of pin holes by thickening the film.

A further advantage of the present invention is that a high quality insulating hard carbon film can be formed even at a low temperature around the room temperature, which makes it possible to use various materials as the base plate.

A still further advantage of the present invention is that by using the hard carbon film which can be uniformly made regarding the film thickness and film quality, the matrix board can be suitably applied to a thin film device.

A still further advantage of the present invention is that by using the hard carbon film which has a low dielectric constant, it becomes unnecessary to fine processing of the board to reduce the electric capacity thereof, which makes it possible to widen the element surface to be used as the display.

The thin film two-terminal element comprising the above mentioned hard carbon film of the present invention is especially suitable for use as a switching element of the liquid crystal display device.

A still further advantage of the present invention is that it becomes possible to realize a high quality liquid crystal display device without occurrence of unevenness in display even at a low duty ratio, since the standard deviation of the current distribution in the board surface at the time of applying a predetermined voltage to the thin film two-terminal element is arranged below 35% of the current average, preferably below 18%.

Further objects and advantages of the present invention will be apparent from the following description of the preferred embodiments of the invention as illustrated in the accompanying drawings.

Figure 1:
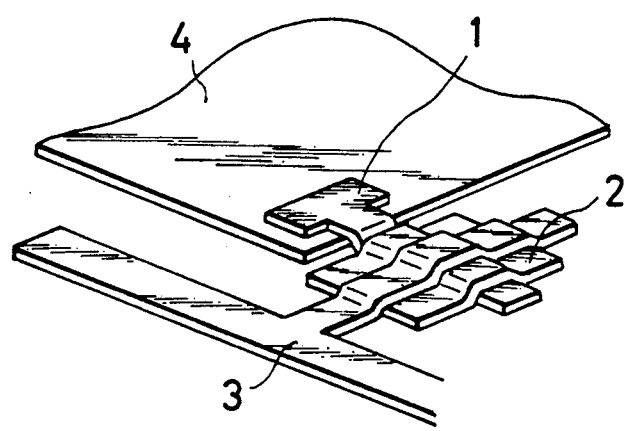
FIG. 1 is a perspective view of the thin film two-terminal element of the active matrix board in accordance with an embodiment of the present invention.

DESCRIPTION OF THE PREFERRED
EMBODIMENTS

Embodiments of the present invention are described below with reference to the drawings.

First, an example of method for producing the active matrix board in accordance with the present invention is described with reference to FIG. 1.

First, a pixel electrode 4 is formed on a transparent insulating substrate (not shown) made from glass or plastic by a sputtering method or a vacuum evaporation method. The electrode 4 is an electrically conductive transparent thin film made from ITO (Indium-Tin-Oxide), ZnO:Al, In$_2$O$_3$, SnO$_2$, etc., deposited on the substrate to about several hundreds to several thousands Å thick. The film 4 is etched to form a predetermined pattern.

After that, an electrically conductive thin film made from Al, Ta, Ti, Cr, Ni, Cu, Au, Ag, W, Mo, Pt, ITO, ZnO:Al, In$_2$O$_3$, SnO$_2$, etc., is deposited to form a lower conductor 1 by a sputtering method or a vacuum evaporation method to about several hundreds to several thousands Å thick. The film 1 is etched to form a predetermined pattern.

After that, a hard carbon film is deposited on the film 1 to form an electrically insulating layer 2 by a plasma CVD method or an ion beam method to the thickness of about 100 to 8000 Å, preferably 200 to 6000 Å, further preferably 300 to 4000 Å. The hard carbon film 2 is mainly constituted from carbon atoms and hydrogen atoms and has either an amorphous structure or a micro-crystal structure. The film 2 is etched to form a predetermined pattern.

The films are etched by preferably a dry etching process.

Finally, an electrically conductive film made from Pt, Al, Cr, Ti, Ni, Cu, Au, Ag, W, Mo, Ta, ITO, ZnO:Al, In$_2$O$_3$, SnO$_2$, etc., is deposited by a sputtering method or a vacuum evaporation method to the thickness of about several hundreds to several thousands Å to form an upper conductor 3. The film 3 is etched to form a predetermined pattern.

It is to be noted that each of the conductors 1 and 3 may be constituted from a double-layered or multi-layered structure comprising a plurality of different kinds of conductive thin films, instead of being formed by a single film.

Also, the positions of the conductors 1 and 3 may be reversed instead of the illustrated structure.

Secondly, the hard carbon film used in the active matrix board in accordance with the present invention is further described in detail below.

The main constituent elements of the film are carbon atoms and hydrogen atoms. The film is composed of a hard carbon film which is called an i-c film, a diamond-like carbon film, amorphous diamond film, or diamond thin film, and which is either amorphous or micro-crystalline. One of the features of the hard carbon film is that the physical properties thereof can be widely controlled by changing the film forming conditions as described later since the film is formed by the gas phase growth process. Therefore, the electric resistirity of the film covers the range from the semiconductor to the insulator. Therefore, the thin film two-terminal element of the present invention functions as an MSI (Metal-Semi.-Insulator) element or an SIS (Semiconductor-Insulator-Semiconductor) element wherein the semiconductor here is the one in which impurities are doped with high density.

It is to be noted that in order to widen the control range of the physical properties of the hard carbon film, the film may further include as a constituent thereof added thereto one of the group III elements of the periodic table below 5 atomic % with respect to all of the constituent atoms, one of the group IV elements below 35 atomic %, one of the group V elements below 5 atomic %, an alkaline earth metal below 5 atomic %, an alkaline metal below 5 atomic %, nitrogen atoms below 5 atomic %, oxygen atoms below 5 atomic %, a chalcogen element below 35 atomic %, or a halogen element below 35 atomic %. The amount of the additional element or atom can be measured by for example the Auger analysis method. Also, this amount may be adjusted and changed according to the other compounds included in the original gas and the film forming conditions.

To form the above mentioned hard carbon film, an organic compound gas, especially a hydrocarbon gas is used as an original gas. The original material is not necessarily in the gaseous phase at the room temperature and normal atmospheric pressure. It is possible to use a material which is liquid or solid and which can be gasified through the process of melting, evaporating, or sublimating the material.

As the hydrocarbon original gas, it is possible to use a gas which includes at least one of for example paraffin group hydrocarbons such as CH$_4$, C$_2$H$_5$, C$_4$H$_{20}$, olefin group hydrocarbons such as C$_2$H$_4$, diolefin group hydrocarbons, acetylene group hydrocarbons, and aromatic hydrocarbons.

Also, it is possible to use compounds other than the hydrocarbons such as alcohol, ketone, ether, or ester, which includes at least the carbon element.

As a method for forming the hard carbon film from the original gas in accordance with the present invention, it is desirable to adopt one in which the film forming active species is formed through a plasma state generated by using a direct current, a low frequency wave, a radio frequency wave, or a micro wave. It is further desirable to adopt one in which a magnetic effect is utilized to deposit the film having a large area and uniform surface and/or to deposit the film at a low temperature. Also, it is possible to form the active species by a thermal decomposition of the material at a high temperature.

Or otherwise, the hard carbon film may be formed through a state of being ion generated by an ionizing evaporation method or an ion beam deposition method. Or the film may be formed from neutral particles generated by a vacuum evaporation method or sputtering method. Further, the film may be formed through processes combined with some of the above mentioned methods.

Examples of the condition for depositing the hard carbon film by a plasma CVD method are as follows.

RF output: 0.1 to 50 W/cm$^2$
Pressure: $10^{-3}$ to 10 Torr
Temperature: Room temp. to 950° C., desirably room temp. to 300° C.

Through the plasma state, the original gas is decomposed to radicals and ions reacting with each other so that a hard carbon film including at least a portion of the state which is amorphous composed of carbon atoms (C) and hydrogen atoms (H) and/or micro-crystal having the crystal size of about several 10 Å to several μm on the base plate.

Physical properties of the hard carbon film are represented in the following table-1.

TABLE 1

| | |
|---|---|
| Specific resistance (ρ) | $10^6$ to $10^{13}$ Ωcm |
| Optical band gap (Egopt) | 1.0 to 3.0 (eV) |
| Hydrogen content (C$_H$) | 10 to 50 (atom %) |
| SP$^3$/SP$^2$ ratio | 2/1 to 4/1 |
| Vickers hardness (H) | below 9500 kg · mm$^{-2}$ |

TABLE 1-continued

| Refractive index (n) | 1.9 to 2.4 |
| Defect density | $10^{17}$ to $10^{19}$ cm$^{-3}$ | wherein each property is measured as follows.
Specific resistance (ρ): determined from I-V characteristic using coplanar cell
Optical band gap (Egopt): obtain absorption coefficient (α) from spectral characteristic and determine from $(\alpha h \nu)^{\frac{1}{2}} = B(h\nu - Egopt)$
Hydrogen content ($C_H$): integrate peaks around 2900 cm$^{-1}$ from infrared absorption spectrum and multiply absorption sectional area A, i.e. $C_H = A \cdot \int \alpha W / W dW$
SP$^3$/SP$^2$ ratio: resolve infrared absorption spectrum to Gaussian functions of SP$^3$ and SP$^2$ and determine from area of functions
Vickers hardness (H): by micro-Vickers meter
Refractive index (n): by ellipsometer
Defect density: by ESR.

Figure 2:
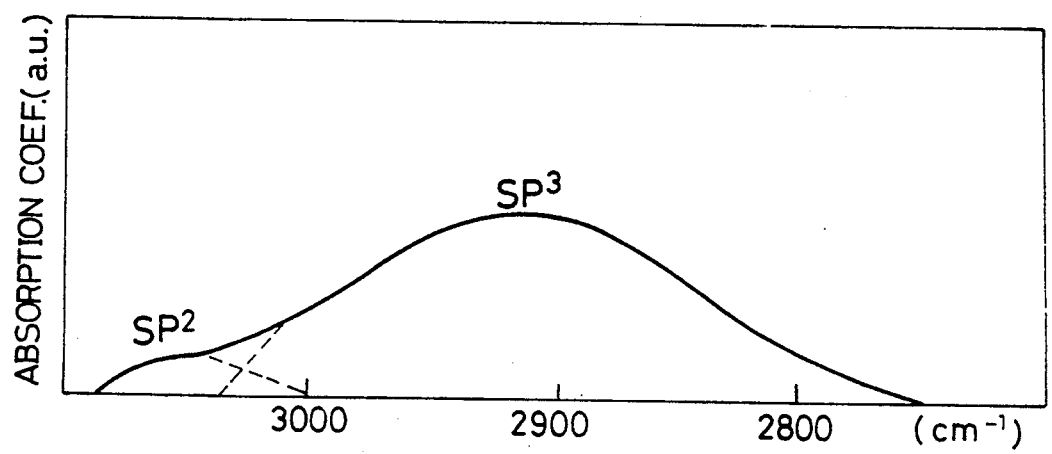
FIG. 2 is a graphical view for explaining the IR spectrum of the hard carbon film.
Figure 3:
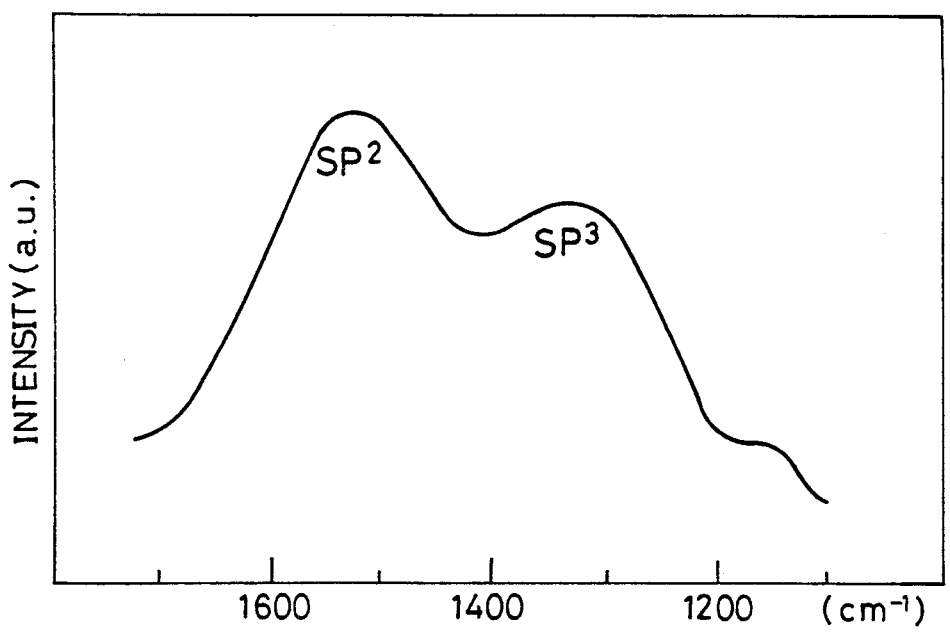
FIG. 3 is a graphical view for explaining the Raman spectrum of the hard carbon film.
Figure 4:
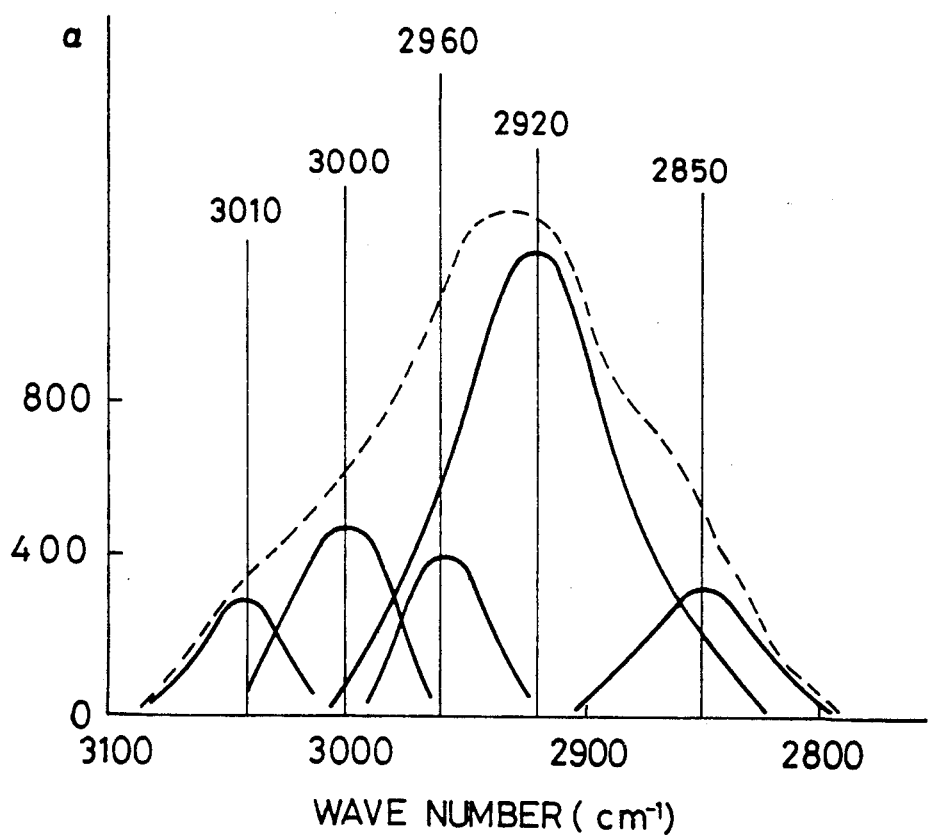
FIG. 4 is a graphical view for explaining the peak separation of the IR spectrum by Gaussian distribution.

According to the result of analysis by an IR absorption method and Raman spectroscopy, the hard carbon film formed as mentioned above has atomic bond in which carbon atoms form hybridized orbitals of SP$^3$ and SP$^2$, as illustrated in FIGS. 2 and 3. The ratio between SP$^3$ and SP$^2$ can be presumed by separating peaks of the IR spectrum. A plurality of different modes of spectra are superposed around the wave number of 2800 to 3150 cm$^{-1}$ of the IR spectrum. The spectrum mode of each peak in relation to the wave number is known in advance. Therefore, the ratio between SP$^3$ and SP$^2$ can be determined by separating the peaks in accordance with Gaussian distribution as illustrated in FIG. 4, and calculating the area of each peak and the ratio therebetween.

Also, according to the result of analysis of the hard carbon film by using X-ray diffraction and electron beam diffraction, the film is in a state of being amorphous (a-C:H) and/or in a state of being amorphous which includes micro-crystalline particles of several 10 Å to several μm.

In general, in the case wherein the plasma CVD method which is suitable to mass production is used, the specific resistance and the hardness of the film are increased according as the rf power is reduced. And the life time of the active species is elongated according as the pressure is lowered. Therefore, it becomes possible to make the film at the lower temperature and make the uniform and large film. Also, the specific resistance and the hardness of the film can be increased. Further, since the plasma density is decreased in a low pressure, it is very efficacious to utilize the magnetic field trapping effect to increase the specific resistance.

Further, the plasma CVD method makes it possible to produce a high quality hard carbon film at a relatively low temperature such as the room temperature to 150° C., which enables to lower the temperature of the thin film two-terminal element producing process. Accordingly, the freedom of material choice for the substrate becomes widen and the temperature of the plate becomes easy to control, which makes it possible to form a uniform film over a wide area.

As represented in the table-1, the structure and the properties of the hard carbon film are widely controllable, which increases the design freedom of the device characteristic. Further, the dielectric constant of the film is relatively low as 3 to 5, in comparison to those of Ta$_2$O$_5$, Al$_2$O$_3$, SiNx which are used in the related are MIM element. Therefore, a large element can be used for producing a device having a given electric capacity, which makes it possible to increase the through-put of the production of the device without a fine processing thereof necessitated. It is to be noted that the capacity ratio between the LCD and the MIM is such that $C_{LCD}:C_{MIM}=10:1$, corresponding to the relation of driving conditions therebetween.

Further, since the film is hard, it becomes possible to reduce the damage of the device in the rubbing process at the time of sealing the liquid crystal material within the device, thus increasing the through-put thereof.

From the standpoint of the driving condition of the thin film two-terminal element for LCD, it is desirable that the film thickness be 100 to 8000 Å and the specific resistance be $10^6$ to $10^{13}$ Ωcm.

It is to be noted that when the margin of the drive voltage and the endurable voltage (break down voltage) are taken into consideration, it becomes desirable that the film thickness be more than 200 Å. Also, it is desirable that the film thickness be less than 6000 Å to minimize the unevenness of color due to the step difference (difference between the cell gaps) between the pixel portion and the thin film two-terminal element portion. Therefore, it is desirable that the film thickness be 200 to 6000 Å and the specific resistance be $5 \times 10^6$ to $10^{12}$ Ωcm.

The defect number of the element due to pin holes generated in the hard carbon film increases according as the film becomes thin. Especially, when the film thickness is less than 300 Å, the defects are remarkably increased to the extent of defect ratio of 1% and the uniformity of the film thickness in the element and that of the element characteristic are impaired so that the dispersion of the film thickness exceeds 10% since the film thickness can be accurately controlled only when the thickness is more than about 30 Å. Therefore, it is desirable that the film thickness be more than 300 Å.

Also, in order to avoid the removal of the hard carbon film due to the stress acted thereupon and to drive the device at a low duty ratio (preferably below 1/1000), it is desirable that the film thickness be less than 4000 Å.

Taking the points mentioned above into consideration, it becomes desirable that the film thickness of the hard carbon film be 300 to 4000 Å and the specific resistance thereof be $10^7$ to $10^{11}$ Ωcm.

EXAMPLE 1

Pixel electrodes and thin film two-terminal elements are formed on an electrically insulating transparent substrate of Pyrex glass (trade name) as illustrated in FIG. 1 in a matrix arrangement of 640×400 as described below.

First, ITO is deposited on the glass plate to 500 Å thick by a sputtering method. The ITO film is patterned to form the pixel electrodes 4. After that, Al is deposited to 600 Å thick by a vacuum evaporation method. The Al film is patterned to form the lower conductors 1. A hard carbon film is formed on the lower conductors 1 by the plasma CVD process to 800 Å thick. After that, the hard carbon film is patterned by a dry etching process to form the insulating films 2.

After that, Ni is deposited on the insulating film 2 to 1000 Å thick by an EB evaporation method. The Ni film is patterned to form the upper conductors 3 which is used as scanning electrodes.

In the way mentioned above, an active matrix board is fabricated. The film forming conditions for making the hard carbon film of this matrix board are as follows.
Pressure: 0.15 Torr
CH$_4$ flow rate: 10$_{SCCM}$
RF power: 0.2 W/cm$^2$ The active atrix boards produced as mentioned above are examined as follows.

First, ten thousands of elements are sampled and checked their current distribution at the time of applying 12 V voltage thereto. The results were such that the maximum current (Imax) was 19mA, the minimum current (Imin) was 1mA, and the standard deviation ($\sigma_I$) was 35% of the current average value.

Also, the dispersion of the hard carbon film thickness ($\Delta d$) was ±35%, and the dispersion of the specific resistance ($\Delta\rho$) was ±50%.

A liquid crystal cell was made by sealing the liquid crystal material in the gap between the matrix board and a counter board having electrode stripes formed thereon. The drive circuits are mounted on the cell to form a liquid crystal display device. The device represented black and white displays (binary signal display) without unevenness over the display surface, at driving conditions of $V_{on}$=18 V, the bias ratio was ¼, and the duty was 1/512.

The four-scale display could not be performed since the dispersion of the transmittivity between the elements ($\Delta T$) with respect to the intermediate scales exceeded ±15%, when a four-scale signal was input by modulating pulse signals. This is explained more precisely as follows.

To perform the four-scale display, it is necessary to apply a four-level signal having an effective voltage $V_{10}$ for 10% transmittivity, an effective voltage $V_{90}$ for 90% transmittivity, and levels of voltage between the two upper and lower effective voltages, for each pixel. When the level difference between the upper and lower voltages for 10% and 90% transmittivity are equally divided to the two levels, with respect to each pixel, each level difference becomes 27% transmittivity. Therefore, if the dispersion of the transmittivity between pixels becomes more than ±13.5%, the four-scale display can not be performed.

EXAMPLES 2 TO 5

The film thickness and the film forming conditions for the hard carbon film are represented in the table-2. Other conditions are the same as the first example 1. The examples performed the binary signal display but could not perform the four-scale display. Note that an appropriate voltage $V_{on}$ was applied to each example.

EXAMPLE 6 TO 8

The film thickness and the film forming conditions for the hard carbon film are represented in the table-2. Other conditions are the same as the first example 1. The examples 6 to 8 are featured in that the gas is introduced by the shower type gas supply method instead of the nozzle type. Each example could perform the binary signal display and the four-scale display as well.

REFERENCE 1

The pressure which is one of the film forming conditions for the hard carbon film was higher than the example 1 mentioned above. Other conditions were the same as the example 1. The standard deviation $\sigma_I$ and the film thickness dispersion $\Delta d$ were high as $\sigma_I$ was 38% of the average and $\Delta d$ was ±50%. The dispersion of the resistance $\Delta\rho$ was approximately the same as that of the example 1.

The reference 1 could not perform the binary signal display nor the four-scale display, either.

REFERENCE 2

The film forming conditions were approximately the same as those of the example 3 other than that the flow rate was low in comparison to the example 3. The standard deviation $\sigma_I$ was the resistance dispersion $\Delta\rho$ were high as $\sigma_I$ was 36% of the average and $\Delta\rho$ was ±99%. The film thickness dispersion $\Delta d$ was approximately the same as that of the example 3.

The reference 2 could not perform the binary signal display nor the four-scale display, either.

The conditions mentioned above are represented in the following table-2.

TABLE 2

|  | Ref. 1 | Ex. 1 | Ex. 2 | Ref. 2 | Ex. 3 | Ex. 4 | Ex. 5 |
|---|---|---|---|---|---|---|---|
| Dis. (A)* |  |  |  |  |  |  |  |
| Imax(mA) | 19 | 19 | 11 | 9.0 | 9.0 | 3.7 | 84 |
| Imin(mA) | 0.1 | 1.0 | 0.6 | 1.0 | 1.3 | 0.7 | 28 |
| $\sigma_I$(%) | 38 | 35 | 34 | 36 | 32 | 29 | 20 |
| Dis. (B)* |  |  |  |  |  |  |  |
| $\Delta d$(± %) | 50 | 35 | 25 | 15 | 15 | 16 | 6 |
| $\Delta\rho$(± %) | 51 | 50 | 49 | 99 | 95 | 29 | 20 |
| Dsp. ab.* |  |  |  |  |  |  |  |
| Binary | x | o | o | x | o | o | o |
| Four-scale | x | x | x | x | x | x | x |
| Con.* |  |  |  |  |  |  |  |
| Pressure* | $3.5 \times 10^{-1}$ | $1.5 \times 10^{-1}$ | $1.5 \times 10^{-1}$ | $3.5 \times 10^{-2}$ | $3.5 \times 10^{-2}$ | $3.5 \times 10^{-2}$ | $3.5 \times 10^{-2}$ |
| Flow rate* | 10 | 10 | 10 | 2 | 3 | 3 | 10 |
| RF power* | 0.2 | 0.2 | 1.0 | 0.3 | 0.3 | 2.5 | 0.3 |
| Gas int. | nozzle | nozzle | nozzle | nozzle | nozzle | nozzle | nozzle |
| Thick. (Å) | 800 | 800 | 1100 | 950 | 950 | 2500 | 950 |

|  | Ex. 6 | Ex. 7 | Ex. 8 |
|---|---|---|---|
| Dis. (A)* |  |  |  |
| Imax(mA) | 82 | 80 | 17 |
| Imin(mA) | 30 | 32 | 9 |
| $\sigma_I$(%) | 18 | 17 | 12 |
| Dis. (B)* |  |  |  |
| $\Delta d$(± %) | 5 | 2 | 1 |
| $\Delta\rho$(± %) | 11 | 50 | 30 |
| Dsp. ab.* |  |  |  |
| Binary | o | o | o |

TABLE 2-continued

| | | | |
|---|---|---|---|
| Four-scale Con.* | ○ | ○ | ○ |
| Pressure* | $7.0 \times 10^{-2}$ | $3.5 \times 10^{-2}$ | $3.5 \times 10^{-2}$ |
| Flow rate* | 10 | 10 | 10 |
| RF power* | 0.3 | 0.3 | 1.0 |
| Gas int. | shower | shower | shower |
| Thick. (Å) | 950 | 950 | 950 |

Note:
"Dis. (A)" is 'Dispersion of element characteristic'.
"Dis. (B)" is 'Dispersion of i-C film'
"Disp. ab." is 'Display ability'
"Con." is 'Conditions for forming i-C film'
The units for Pressure, Flow rate and RF power are Torr, SCCM and W/cm², respectively.

Many widely different embodiments of the present invention may be constructed without departing from the spirit and scope of the present invention. It should be understood that the present invention is not limited to the specific embodiments described in the specification, except as defined in the appended claims.

What is claimed is:

1. An active matrix board capable of performing a four-scale display, comprising:
an electrically insulating transparent substrate;
a pixel electrode disposed in two dimensions on said substrate for each pixel;
a scanning electrode arranged in common to said pixel electrodes disposed along a predetermined direction; and
a switching element disposed between each of said pixel electrodes and said scanning electrode, and constituted from a thin film two-terminal element which is composed of a first conductor, a second conductor, and a hard carbon film disposed between said first and second conductors,
said switching element passing an electric current when applied with a voltage of 12 volts, wherein said current ranges from 9nA to 82nA, said switching element having a standard deviation of current distribution in a surface of said substrate, wherein said standard deviation is equal to or less than 35% of an average value of said passed current,
said hard carbon film having a film thickness within a range from 300 Å to 4000 Å, said hard carbon film having a standard deviation of film thickness distribution in a surface of said substrate, wherein said standard deviation is equal to or less than ±5% of a median of said film thickness distribution.

2. An active matrix board according to claim 1, wherein said hard carbon film is formed by a gas phase growth process in which an original gas is introduced through a shower type gas supplying means.

3. An active matrix board capable of performing a fourscale display, comprising:
an electrically insulating transparent substrate;
a pixel electrode disposed in two dimensions on said substrate for each pixel;
a scanning electrode arranged in common to said pixel electrodes disposed along a predetermined direction; and
a switching element disposed between each of said pixel electrodes and said scanning electrode, and constituted from a thin film two-terminal element which is composed of a first conductor, a second conductor, and a hard carbon film disposed between said first and second conductors,
said switching element passing an electric current when applied with a voltage of 12 volts, wherein said current ranges from 9nA to 82nA, said switching element having a standard deviation of current distribution in a surface of said substrate, wherein said standard deviation is equal to or less than 35% of an average value of said passed current,
said hard carbon film having an electric resistivity within a range from $10^7 \Omega$ cm to $10^{11} \Omega$ cm, said hard carbon film having a standard deviation of electric resistivity distribution in a surface of said substrate, wherein said standard deviation is equal to or less than ±50% of a median of said electric resistivity distribution.

4. An active matrix board according to claim 3, wherein said hard carbon film is formed by a gas phase growth process in which an original gas is introduced through a shower type gas supplying means.

5. An active matrix board capable of performing a fourscale display comprising:
an electrically insulating transparent substrate;
a pixel electrode disposed in two dimensions on said substrate for each pixel;
a scanning electrode arranged in common to said pixel electrodes disposed along a predetermined direction; and
a switching element disposed between each of said pixel electrodes and said scanning electrode, and constituted from a thin film two-terminal element which is composed of a first conductor, a second conductor, and a hard carbon film disposed between said first and second conductors,
said hard carbon film having a film thickness within a range from 300 Å to 4000 Å, said hard carbon film having a standard deviation of film thickness distribution in a surface of said substrate, wherein said standard deviation is equal to or less than ±5% of a median of said film thickness distribution,
said hard carbon film having an electric resistivity within a range from $10^7 \Omega$ cm to $10^{11} \Omega$ cm, said hard carbon film having a standard deviation of electric resistivity distribution in a surface of said substrate, wherein said standard deviation is equal to or less than ±50% of a median of said electric resistivity distribution.

6. An active matrix board according to claim 5, which is adapted so that said switching element passes an electric current when applied with a voltage of 12 volts, wherein said current ranges from 9nA to 82nA, and that said switching element has a standard deviation of current distribution in a surface of said substrate, wherein said standard deviation is equal to or less than 35% of an average value of said passed current.

7. An active matrix board according to claim 5, wherein said hard carbon film is formed by a gas phase growth process in which an original gas is introduced through a shower type gas supplying means.

* * * * *